June 6, 1944.  C. L. HAMM  2,350,755
DYNAMO-ELECTRIC MACHINE
Filed Aug. 14, 1942
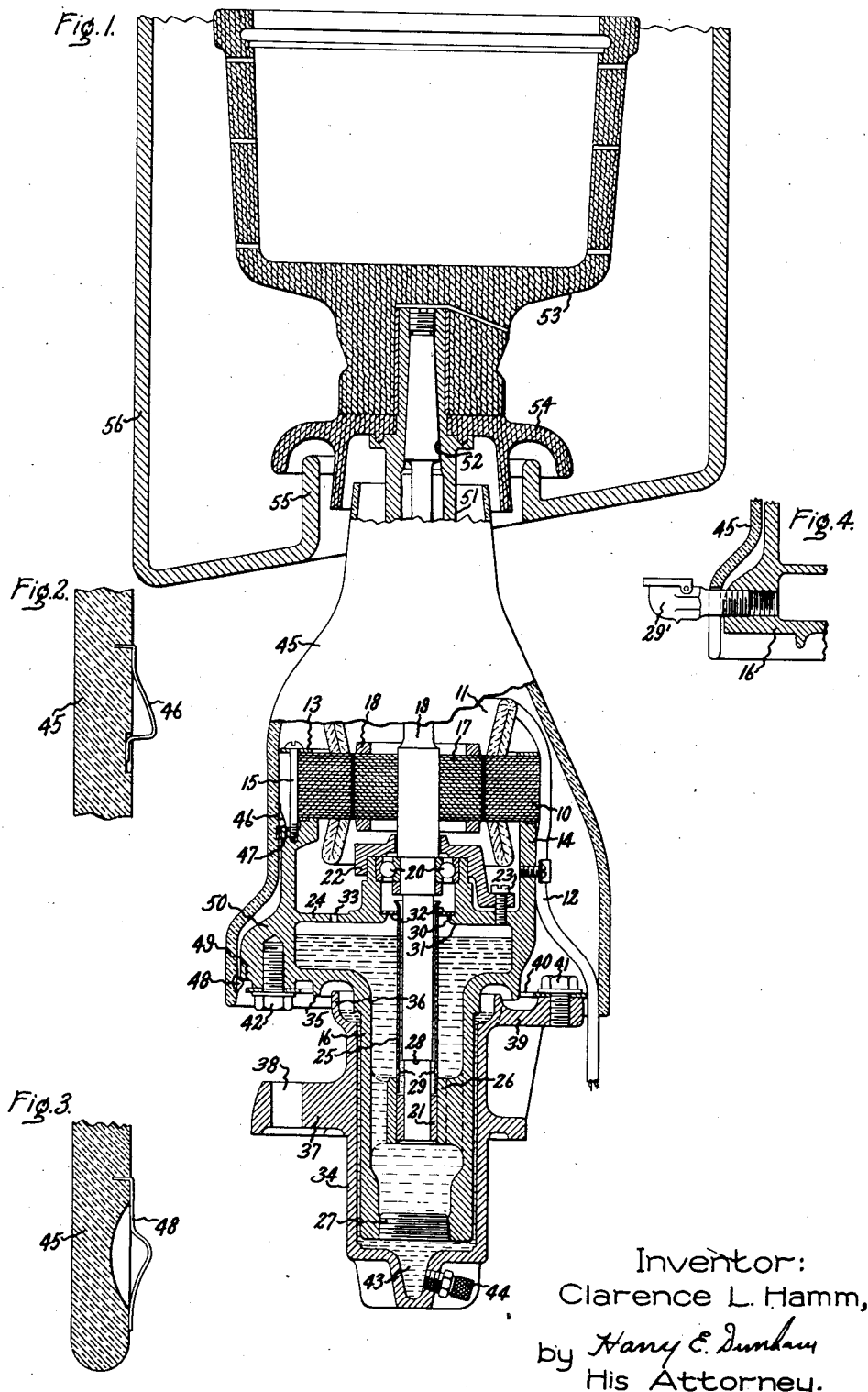
Inventor:
Clarence L. Hamm,
by Harry E. Dunham
His Attorney.

Patented June 6, 1944

2,350,755

UNITED STATES PATENT OFFICE 2,350,755

DYNAMOELECTRIC MACHINE

Clarence L. Hamm, Marblehead, Mass., assignor to General Electric Company, a corporation of New York Application August 14, 1942, Serial No. 454,793

7 Claims. (Cl. 172—36)

My invention relates to dynamo-electric machines and more particularly to an arrangement for protecting machines of this type which are used in locations where corrosive substances might come in contact with the machine.

An object of my invention is to provide an improved dynamo-electric machine having an acid-resisting housing or protective covering arranged about the machine.

Another object of my invention is to provide an improved vertical shaft dynamo-electric machine adapted to drive a spinning spindle and provided with a protective acid-resisting structure arranged about the machine.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing Fig. 1 is an elevational view, partly in section, of a spinning motor embodying my invention; Fig. 2 is an enlarged sectional view illustrating the upper support of the protective housing on the stationary member of the motor; Fig. 3 is an enlarged sectional view illustrating the locking spring arrangement adjacent the lower end of the protective housing; and Fig. 4 is a partial sectional view from the back of the machine as shown in Fig. 1 showing the lubricant reservoir filling cup construction.

Referring to the drawing I have shown a rayon spinning motor having a stationary member including a laminated core structure 10 provided with a suitable stator field exciting winding 11 adapted to be energized by current from a source of electrical power supply connected to the stator winding terminal lead 12. The stationary member of the motor is secured by an end ring 13 to a lower end shield 14 by a plurality of screws 15 arranged in circumferentially spaced apart relationship about the periphery thereof. The lower end shield of the motor is provided with an elongated hollow bearing housing 16 arranged to support the motor and the spinning device and is resiliently supported to aid in damping out oscillations which might produce harmful vibrations. The motor is provided with a rotatable member including a laminated core 17 having a squirrel cage winding 18 and is mounted on a vertically extending shaft 19 arranged to drive a spinning device. The rotatable member is supported by a ball bearing 20 arranged intermediate the ends of the shaft 19 and by a sleeve bearing 21 arranged about the lower end of the shaft. A bearing cover plate 22 is secured by a screw 23 to a web 24 which extends across the upper portion of the lubricant reservoir 16 and which supports the ball bearing 20. This bearing cover plate is arranged about the shaft 19 so as to prevent the flow of lubricating oil past the bearing 20 to the motor and also secures the ball bearing in position on the web 24. The sleeve bearing 21 is mounted below the lower end of a thin axially extending cylindrical sleeve 25 and is supported in a boss 26 formed in the lower end of the bearing housing 16. This bearing housing serves as a lubricant reservoir for the bearings 20 and 21 and a drain plug 27 is threaded into an opening formed in the bottom of the bearing housing 16 to facilitate removal of lubricant from the housing.

The ball bearing 20 is lubricated by oil which is pumped from the lubricant reservoir between the shaft 19 and the sleeve 25 by cavitation produced by a shoulder 28 on the shaft 19 which is arranged slightly above openings 29 formed in the sleeve 25. Lubricating oil is supplied to the reservoir through a filling cup 29' secured in the bearing housing 16. The upper end of the sleeve 25 is held in position by a disk 30 which is secured on a flange 31 formed on the web 24, and openings 32 are formed in the disk 30 to provide for drainage of any excess lubricant from the bearing 20 back into the reservoir formed by the housing 16. The web 24 of the bearing housing also is formed with an opening 33 communicating with the interior of the bearing housing to provide for drainage of any oil from above this web back into the lubricant reservoir and to equalize pressures within and without the oil chamber.

A hollow cup-shaped housing 34 is arranged in closely spaced relationship about the lower reduced diameter portion of the bearing housing 16 and extends coaxially therewith. An annular overhanging flange 35 is formed on the bearing housing 16 adjacent the lower reduced portion thereof and extends about an upwardly extending flange 36 formed on the upper end of the housing 34. This arrangement forms a seal about the top of the stationary housing 34 and excludes foreign substances, such as acids used in the spinning process. A plurality of outwardly extending arms 37 is formed on the stationary housing 34 and is provided with axially extending openings 38 for securing the housing to a supporting structure. Three outwardly extending arms 39 are formed on the stationary housing 34 adjacent the upper end thereof and are secured to a flexible supporting ring 40 by screws 41. The supporting ring 40 is secured to the lower end shield 14 of the motor by three screws 42 arranged intermediate the arms 39 and flexibly support the motor on the stationary housing 34. In order to dampen oscillations of the motor, a damping fluid 43, such as lubricating oil, is placed in the space between the bearing housing 16 and the stationary housing 34, and a filler plug 44 is threaded into an opening in the bottom of the housing 34 to facilitate removal of the damping fluid.

This driving motor is adapted to be protected from corrosive substances, such as acids used in the spinning process, by an acid-resisting housing 45 made of any suitable material, such as a synthetic resin or glass, which conforms to the general contours of the motor and extends from adjacent the upper end of the shaft 19 to below the upper end of the stationary housing 34. This protective housing 45 is provided with a plurality of supporting snap springs 46 which are secured to the inner surface of the housing and are adapted to engage shoulders 47 formed on the lower end shield 14 of the motor. The housing is locked in position on the motor by a plurality of snap springs 48 secured thereto adjacent the lower edge thereof and arranged to snap over the lower edge 49 of bosses 50 formed on the lower end shield 14. This housing may be molded to the desired shape and formed to provide for the protection of the lead 12 of the motor stationary member winding 11. The upper portion of the housing 45 is formed with an axial opening therein through which the upper end of the shaft 19 extends. An adapter 51 is mounted on a tapered upper portion 52 of the shaft 19 and is arranged to support a spinning bucket 53 mounted on a double flange skirt acid deflector member 54 also formed of an acid-resisting material. The skirt member 54 extends downwardly over the upper end portion of the housing 45 and forms a running labyrinth seal with an upturned flange 55 arranged between the double flange skirt and formed on an acid collection basin 56 into which acid and water extracted from material in the bucket 53 are collected. This minimizes the entrance of foreign substances into the upper end of the housing and provides a protective construction in which it is not necessary that the various metallic parts of the motor and its associated elements be made of acid-resisting material, as the housing 45 and the skirt member 54 cooperate with the basin 56 to protect the driving elements against the corrosive action of acids and the like.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A vertical shaft dynamo-electric machine including a rotatable member with a vertically extending shaft and a stationary member including a supporting frame, an acid-resisting housing substantially covering said stationary member, means for supporting said housing on said stationary member, and means including a skirt member of acid-resisting material extending downwardly over the upper end portion of said housing for minimizing the entrance of foreign substances into the upper end of said housing.

2. A vertical shaft dynamo-electric machine including a rotatable member with a vertically extending shaft and a stationary member including a core of magnetic material and a core supporting frame, an acid-resisting housing substantially covering said stationary member and having an upwardly extending portion arranged about the upper portion of said shaft, means for supporting said housing on said stationary member, and means including a skirt member of acid-resisting material extending downwardly over the upper end portion of said housing for minimizing the entrance of foreign substances into the upper end of said housing.

3. A vertical shaft dynamo-electric machine including a rotatable member with a vertically extending shaft and a stationary member including a core of magnetic material and a core supporting frame, an acid-resisting housing substantially covering said stationary member and said supporting frame and having an upwardly extending portion arranged about the upper portion of said shaft, means for supporting said housing on said stationary member, and means including a skirt member of acid-resisting material mounted on said shaft and extending downwardly over the upper end portion of said housing for minimizing the entrance of foreign substances into the upper end of said housing.

4. A vertical shaft dynamo-electric machine including a rotatable member with a vertically extending shaft and a stationary member including a core of magnetic material and a core supporting frame, an acid-resisting synthetic resin housing substantially covering said stationary member, means for supporting said housing on said stationary member, and means including a skirt member of acid-resisting material extending downwardly over the upper end portion of said housing for minimizing the entrance of foreign substances into the upper end of said housing.

5. A vertical shaft dynamo-electric machine including a rotatable member with a vertically extending shaft and a stationary member including a core of magnetic material and a core supporting frame, an acid-resisting vitreous housing substantially covering said stationary member and having an upwardly extending portion arranged about the upper portion of said shaft, means for supporting said housing on said stationary member, and means including a skirt member of acid-resisting material extending downwardly over the upper end portion of said housing for minimizing the entrance of foreign substances into the upper end of said housing.

6. A vertical shaft dynamo-electric machine including a rotatable member with a vertically extending shaft and a stationary member including a core of magnetic material and a core supporting frame, an acid-resisting housing substantially covering said stationary member and said supporting frame and having an upwardly extending portion arranged about the upper portion of said shaft, means including springs for supporting said housing on said stationary member, and means including a skirt member of acid-resisting material mounted on said shaft and extending downwardly over the upper end portion of said housing for minimizing the entrance of foreign substances into the upper end of said housing.

7. A vertical shaft dynamo-electric machine including a rotatable member with a vertically extending shaft and a stationary member including a core of magnetic material and a core supporting frame, a housing substantially covering said stationary member and having an upwardly extending portion arranged about the upper portion of said shaft, means including a plurality of snap springs for supporting and locking said housing on said stationary member, and means including a skirt member extending downwardly over the upper end portion of said housing for minimizing the entrance of foreign substances into the upper end of said housing.

CLARENCE L. HAMM.